(12) United States Patent
Brewster

(10) Patent No.: US 7,113,868 B2
(45) Date of Patent: Sep. 26, 2006

(54) METHOD AND SYSTEM FOR PROCESSING GEOPHYSICAL SURVEY DATA

(75) Inventor: James Brewster, Lincoln Park, NJ (US)

(73) Assignee: Bell Geospace, Inc., Houston, TX (US)

( * ) Notice: Subject to any disclaimer, the term of this patent is extended or adjusted under 35 U.S.C. 154(b) by 127 days.

(21) Appl. No.: 10/916,312

(22) Filed: Aug. 11, 2004

(65) Prior Publication Data

US 2006/0036367 A1 Feb. 16, 2006

(51) Int. Cl.
G01V 7/00 (2006.01)
(52) U.S. Cl. .......................................... 702/5
(58) Field of Classification Search .................. 702/2, 702/5; 73/382 G
See application file for complete search history.

(56) References Cited

U.S. PATENT DOCUMENTS

| | | | |
|---|---|---|---|
| 3,731,537 A * | 5/1973 | Trageser .................... | 73/382 R |
| 5,339,684 A | 8/1994 | Jircitano et al. ........... | 73/178 R |
| 5,357,802 A | 10/1994 | Hofmeyer et al. ......... | 73/382 G |
| 5,359,889 A | 11/1994 | Jircitano et al. ........... | 73/178 R |
| 5,402,340 A * | 3/1995 | White et al. ................ | 702/5 |
| 5,922,951 A | 7/1999 | O'Keefe et al. ........... | 73/382 G |
| 6,125,698 A * | 10/2000 | Schweitzer et al. ....... | 73/382 G |
| 6,152,226 A * | 11/2000 | Talwani et al. ........... | 166/252.4 |
| 6,212,952 B1 * | 4/2001 | Schweitzer et al. ....... | 73/382 G |
| 6,278,948 B1 | 8/2001 | Jorgensen et al. .......... | 702/6 |
| 6,424,918 B1 * | 7/2002 | Jorgensen et al. .......... | 702/6 |
| 6,430,507 B1 * | 8/2002 | Jorgensen et al. .......... | 702/6 |
| 6,675,097 B1 * | 1/2004 | Routh et al. ............... | 702/2 |
| 6,804,608 B1 * | 10/2004 | Lee et al. ................... | 702/5 |
| 6,954,698 B1 * | 10/2005 | Tryggvason ................ | 702/5 |
| 2003/0033086 A1 | 2/2003 | Lee et al. ................... | 702/5 |
| 2004/0201585 A1 * | 10/2004 | Srivastava et al. ......... | 345/423 |
| 2006/0004519 A1 * | 1/2006 | Humphrey et al. ......... | 702/3 |

FOREIGN PATENT DOCUMENTS

| | | |
|---|---|---|
| WO | WO 02/103398 | 12/2002 |
| WO | WO 03/032015 | 4/2003 |
| WO | WO 03/076970 | 9/2003 |

OTHER PUBLICATIONS

Lyrio, J.S.C.O., "Wavelet denoising of gravity gradiometry data," *Gravity and Magnetic Research Consortium*, Department of Geophysics, Colorado School of Mines, 2001.
Li, Yaoguo, "Processing gravity gradiometer data using an equivalent source technique," *Gravity and Magnetics Research Consortium*, Department of Geophysics, Colorado School of Mines, Golden, Co.
International Search Report for PCT/US05/28308.

* cited by examiner

*Primary Examiner*—Donald McElheny, Jr.
(74) *Attorney, Agent, or Firm*—McDonnell Boehnen Hulbert & Berghoff LLP

(57) ABSTRACT

A method and system for processing geophysical survey data is provided. Gravity gradiometry data is processed by approximating density values of terrain signals to remove contributions of the terrain from the gravity gradiometry data. Initially, a predicted gravity gradient data set for a geographical area is calculated using terrain data with unit density. Next, a mathematical transformation is applied to recorded gravity gradiometer data of the geographical area and the predicted gravity gradiometry data. The transformation divides the data into component sub-functions so that each component function can be processed separately. The component sub-functions are processed to estimate densities of the geographical area. Then, using all the estimated densities, gravity gradients due to all of the terrain can be calculated, and subtracted from the recorded gravity gradient signals to reveal gravity gradients due to subsurface masses, for example.

39 Claims, 9 Drawing Sheets

METHOD AND SYSTEM FOR PROCESSING GEOPHYSICAL SURVEY DATA

FIELD OF INVENTION

The present invention relates to methods and systems for processing geophysical survey data.

BACKGROUND

Variations in the Earth's density result in small variations in the Earth's gravitational field. These variations can be measured at the Earth's surface using sensitive gravity meters. Through such measurements, masses of greater or lesser density than surrounding formations may be detected.

Gravity surveying is one technique in modern exploration for geophysically significant subsurface anomalies (or irregularities) potentially associated with ore bodies or hydrocarbon deposits, such as mineral and petroleum commodities. For example, the gravitational anomaly of a body of ore with a density contrast of 300 kg m$^{-3}$ and a dimension of 200 m buried at a depth of 100 m is typically $2\times10^{-6}$ ms$^{-2}$, which is 0.00002% of the normal Earth gravity field. This relatively small effect is normally measured in units of milli gals (mGal), which is the unit for the free air and Bouguer gravity field measurements and is equivalent to $10^{-5}$ m/s$^s$. Thus, for the above example, the body of ore would be represented by 20 mGal.

Currently, many gravity measurements have been made using instruments of the LaCoste/Romberg type that are essentially ultrasensitive spring balances detecting a small difference in weight caused by the gravity anomaly. The measurements are subject to a wide variety of environmental influences, and the measurements should be performed relative to a standard point that is used regularly during the survey as a fixed reference for removal of drifts in the instrument. This procedure can be slow, and may require extensive information on local topography and geology since a normal variation of gravity with height is approximately 0.3 mGal per meter, for example. Within moving platforms, such as aircraft, using this type of relative gravity instrument can be difficult for several reasons including the fact that the use of precision radar altimeters and pressure sensors to achieve vertical position to as little as one meter can impose limitations on the order of a few hundred mGals on the gravity data, for example.

For this reason, some geophysical prospecting has progressed towards gradiometry. In principle, measurement of a gradient of a gravity field over a known baseline allows accelerations due to motion of the platform itself to be cancelled out. Thus, higher precision gravity measurements can be recorded via gravity gradients. Gravity gradients are the spatial derivative of the gravity field, and have units of mGal over distance, such as mGal/m. The standard unit of gravity gradiometry is the Eötvös (E), which is equal to 0.1 mGal/kilometer or $10^{-9}$/s$^2$ (e.g., gradient signatures of shallow Texas salt domes are typically 50 to 100 E).

Precision and accuracy of gravity gradiometer data depends upon the precision of the measurement device and the physical conditions at the point of observation. For example, nearby hills rising above the elevation of adjacent land cause a change in gravity readings. Likewise, nearby valleys cause a change in gravity readings due to a deficiency of attractive mass. However, the extent to which gravity gradiometer data does not match the terrain indicates detection of geophysical subsurface anomalies potentially associated with ore bodies or geology associated with hydrocarbon deposits. Therefore, gravity gradiometry data requires a "terrain" correction to account for these topographic effects that cause changes in gravity readings to expose possible geophysical subsurface anomalies.

In many gravity surveys, a largest component of the recorded gravity gradient signal originates from the terrain. Calculations to remove the terrain effect may require a knowledge of the local topography and density of surface rocks in the vicinity of each gravity reading. The portion of a recorded gravity gradient signal due to the terrain is usually removed by a manual application of a-priory geophysical knowledge. Density of the terrain near the surface is estimated based on a combination of available geological information and general geological concepts.

However, subsurface anomalies and terrain can have varying densities. Without accurate density values for the surface terrain, modeling of deep subsurface structures can be incorrect. Thus, when performing a gravity survey, a signal due to gravity gradients from subsurface anomalies and a signal due to the terrain will need to be analyzed and processed using different values of density. Thus, a means of processing gravity gradiometry signals using varying density values is desired.

SUMMARY

In one embodiment, a method of processing geophysical survey data is provided. The method includes receiving geophysical data recorded from a geographical area by a sensor. The method also includes calculating predicted geophysical data of the geophysical area using a fixed geophysical parameter, and identifying a relationship between the geophysical data and the predicted geophysical data.

In another respect, the method includes receiving geophysical data recorded from a geographical area by a sensor. The method also includes dividing the geophysical data into components based on time, and processing the components to reveal geophysical data not corresponding to a terrain of the geographical area.

The method may be performed to determine a surface density signal representative of a portion of terrain in the geographical area, which may result from a linear relationship between the geophysical data and the predicted geophysical data, for example.

In one aspect, the method may involve performing a wavelet transformation of the geographical data and the predicted geophysical data to produce recorded wavelet coefficients and predicted wavelet coefficients, which can then be processed to determine a density of a portion of the terrain in the geophysical area.

The geophysical survey data may be data recorded from a sensor, such as a gravity gradiometer instrument (GGI), a gravimeter, or a full-tensor gradiometer (FTG), for example. The sensor may also be any other multi-channel sensor, such as a sensor including multiple channels, for example, or any other single-channel sensor as well.

These as well as other features, advantages and alternatives will become apparent to those of ordinary skill in the art by reading the following detailed description, with appropriate reference to the accompanying drawings.

DETAILED DESCRIPTION

In an example embodiment, gravity gradiometry data is processed by approximating density values of terrain signals to remove contributions of the terrain from the gravity gradiometry data. For example, after obtaining data recorded by gravity gradiometer instruments (GGI) from a geographical area, a predicted gravity gradient is calculated using terrain data with unit density. Next, a mathematical transformation is applied to the recorded gravity gradiometer data and the predicted gravity gradiometry. The transformation divides the data into component sub-functions so that each component function can be processed separately.

The component sub-functions can be processed to estimate densities of the geographical area. For example, each component sub-function can be processed independently to determine a density of a portion of the geographical area. Then, using all the estimated densities, gravity gradients due to all of the terrain (or surface of the geographical area) can be calculated, and subtracted from the recorded gravity gradient signals to reveal gravity gradients due to subsurface masses, for example.

I. Survey Flying

A geophysical survey is conducted, using specialized instruments, by flying over a terrain of interest at a low altitude of 100 m, for example. A gravity survey flight plan usually specifies nominal ground clearances of between 80 and 120 meters, for example, dependent upon topographic characteristics. A series of nominally parallel survey lines can be flown until the total region to be surveyed has been covered.

Figure 1:
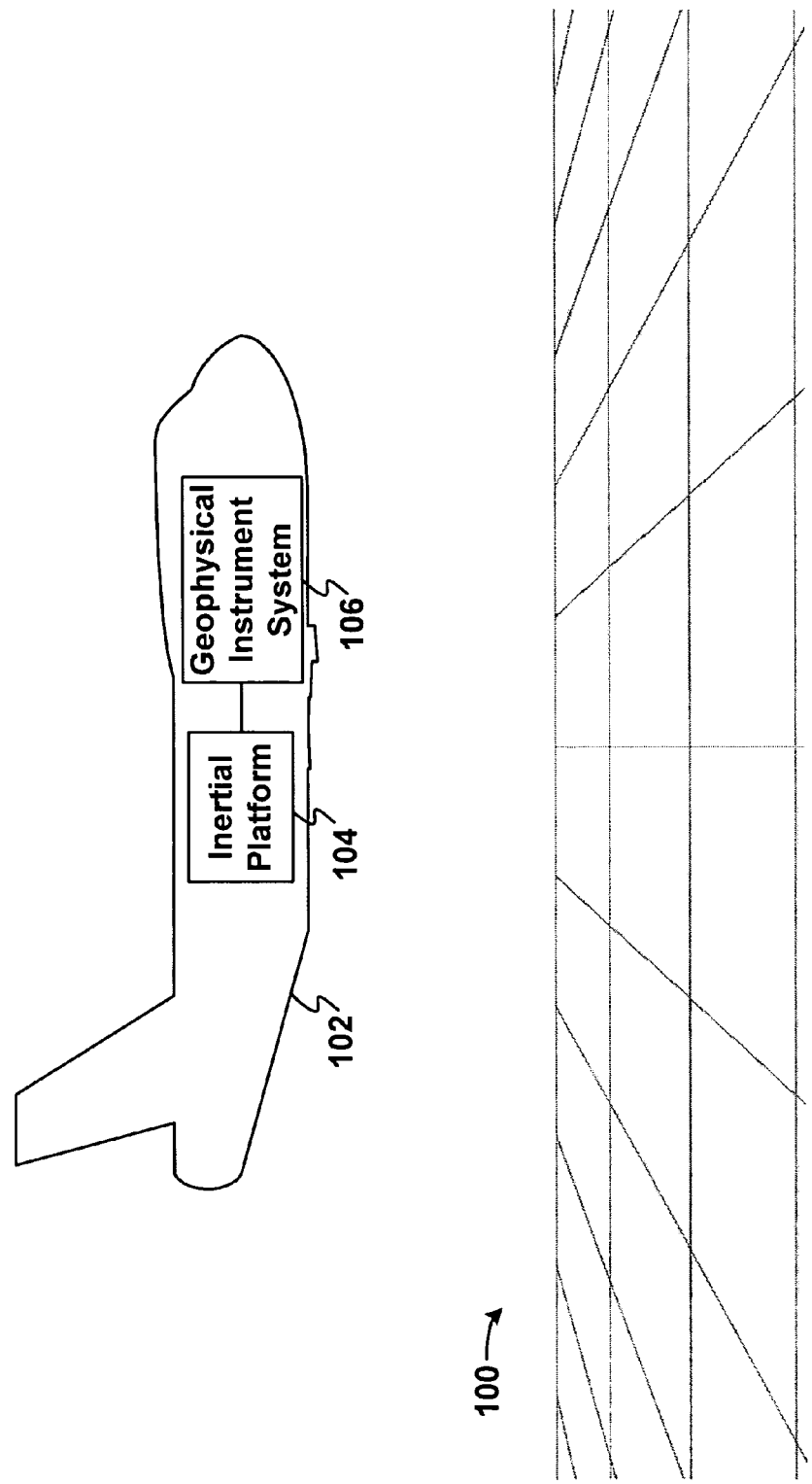
FIG. 1 illustrates one example of a conceptual survey flight.

FIG. 1 generally illustrates a conceptual survey flight. A geographic area 100 is selected for a survey, and the area can be divided into survey lines to facilitate collection of data. Airborne geophysical measurements can be made using an aircraft 102 equipped with an inertial platform 104 and a geophysical instrument system 106. The inertial platform 104 may be any type of inertial navigation system (INS), for example. The inertial platform 104 provides measurements of the attitude (roll, pitch and heading) of the aircraft, and also possibly measurements of the acceleration, velocity, and position of the aircraft. The inertial platform 104 may include, for example, three accelerometers, and to obtain desired outputs, it is typically necessary to maintain the accelerometers pointing in a north, east, down reference frame (down is a local direction obtained with reference to gravity). The accelerometers within the inertial platform 104 output a signal that is a function of acceleration. Integrating the outputs of the accelerometers produces velocity outputs and integrating again produces position outputs.

The inertial platform 104 can be a component of the geophysical instrument system 106 that provides accurate measurements of the vertical velocity and acceleration of the geophysical instrument system 106 ten or more times per second, for example. In such a case, the inertial platform 104 is decoupled from the aircraft 102 and is in the form of a gimbaled assembly so that the inertial platform 104 provides measurements in the frame of reference for the geophysical instrument system 106.

However, as illustrated, the inertial platform 104 can also be a separate component from the geophysical instrument system 106. In such a case, the inertial platform 104 can be in the form of a "strap-down" system, which has the inertial platform 104 rigidly fixed (i.e., strapped down) to the chassis of the moving aircraft. Therefore, the strap-down system moves with the moving body. Sensors of a strap-down system experience and measure changes in reference to the body's fixed axes instead of the north-east-down reference frame. The body's fixed axes are a moving frame of reference as opposed to a constant inertial frame of reference provided with the gimbaled assembly.

Using data collected from the geophysical instrument system 106 together with position data (possibly obtained from an onboard GPS or from the inertial platform 104), the detailed trajectory that was flown by the airborne platform 102 may be determined so that the collected data can be mapped.

Figure 2:
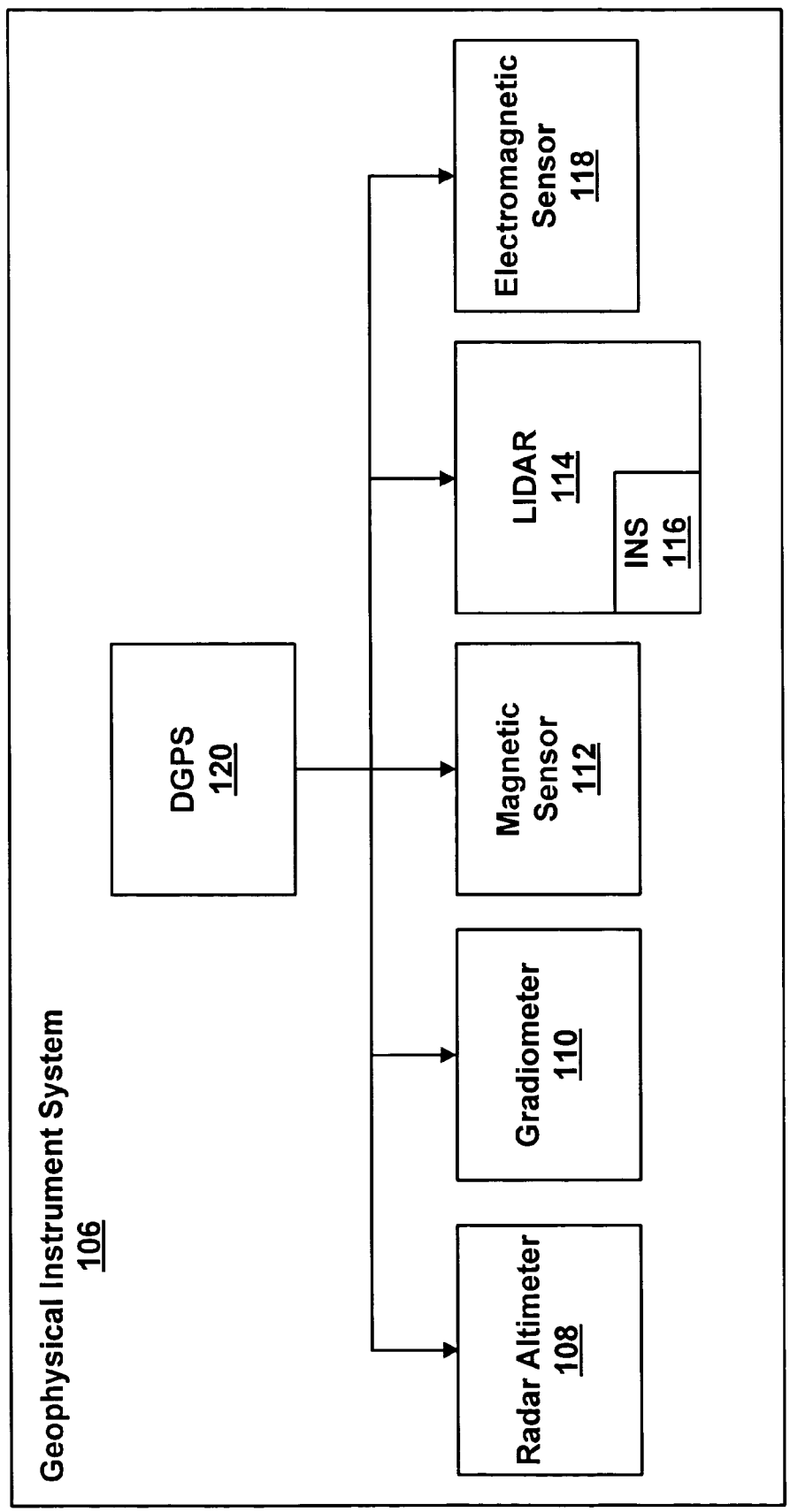
FIG. 2 is a block diagram illustrating one embodiment of a geophysical instrument system.

Different geophysical instruments may be included within the geophysical instrument system 106. FIG. 2 is a block diagram illustrating one embodiment of a geophysical instrument system 106. The system 106 includes a radar altimeter 108 that is used by the aircraft 102 to determine its height above terrain. The radar altimeter 108 determines height above terrain by using radar technology to measure the vertical distance between the aircraft 102 and terrain. The radar altimeter 108 transmits an electronic pulse in the microwave frequency to the Earth's surface. The microwave pulse reflects off the surface and returns to the sensor. Altitude is determined from the pulse travel time (from transmit to receive) and from the waveform of the returned pulse.

The system 106 also includes a gravity gradiometer 110 that measures the spatial rate of change of the Earth's gravity field. The gravity gradiometer 110 provides a signal from which the instantaneous gradient of gravity can be derived. (Note that a measurement of gravity gradient may be preferred for detection of gravity disturbances from an airborne platform because a direct measurement of gravity can not distinguish the gravity signal from accelerations of the instrument associated with the motion of the aircraft).

The system 106 further includes a magnetic sensor 112 that measures distortions and additions to the magnetic field of the Earth due to rocks and minerals below the aircraft 102. For example, the magnetic sensor 112 detects the strength and direction of the earth's magnetic field.

In addition, the system 106 includes a light detection and ranging (LIDAR) sensor 114 that transmits light out to a target and the light interacts with and is changed by the target. Some of the transmitted light is reflected and/or scattered back to the LIDAR sensor 114 where it is analyzed. For example, the time for the light to travel out to the target and back to the LIDAR sensor 114 can be used to determine the range to the target. The readings from the LIDAR sensor 114 can be used for correction of gradients originating from the terrain, for example. The LIDAR sensor 114 also includes an inertial navigation system (INS) 116 to provide a strap-down INS for the system 106 that measures changes in a moving frame of reference, e.g., the aircraft's fixed axes.

The system 106 can also include an electromagnetic sensor 118 that measures the effects of electrical conductivities of rocks and minerals below the aircraft 102. The system 106 further includes a differential global positioning system (DGPS) sensor 120. DGPS is a method of providing differential corrections to a global positioning system (GPS) receiver to improve the accuracy of the navigation system. The GPS is a satellite based navigation system that provides real time position, velocity and timing information. By receiving and processing navigation data from three or more satellites, a GPS receiver can calculate its position on the Earth's surface.

Using this position, one or more reference receivers at known positions can provide DGPS corrections.

The radar altimeter 108, inertial platform 104, gradiometer 110, magnetic sensor 112, LIDAR 114, and electromagnetic sensor 118 are each connected to the DGPS 120 to receive position information. Thus, these sensors in the geophysical instrument that are connected to the DGPS 120 can tag data collected during a survey with position coordinates so that an operator will have knowledge of where the data was collected.

In an alternative embodiment, each sensor in the geophysical instrument system 106 (e.g., the radar altimeter 108, gradiometer 110, magnetic sensor 112, LIDAR 114, and electromagnetic sensor 118) may include its own internal or external GPS/DGPS system. Other satellite based positioning systems such as GLONASS, Galileo, WAAS or EGNOSS can also be used.

The system 106 may include more or fewer sensors and/or components as well. For example, the geophysical instrument system 106 may include peripheral equipment, such as a system control and monitoring computer, a survey planning and tracking computer, internal GPS systems, satellite communication systems, and data processing and archival systems. When required, for marine applications, from a boat or any other type of sea-going vehicle such as a submarine, a multi-beam echo-sounder system could also be included for a swath bathymetry measurement and correction of free air gradients.

In addition, some of the components of the system 106 can be combined into one component, such as including the gravity gradiometer 110 within a Full Tensor Gradient (FTG) instrument, which can perform the functions of the geophysical instrument 106 and the inertial platform 104. It should be understood that this and other arrangements described herein are set forth for purposes of example only, and other arrangements and elements can be used instead and some elements may be omitted altogether. Further, many of the elements described herein are functional entities that may be implemented as hardware, firmware, or software, and as discrete components or in conjunction with other components, in any suitable combination and location.

II. Gravity Gradiometer Data

Referring to the gravity gradiometer 110 illustrated in FIG. 2, the gradiometer 110 is operable to respond to the variations in density of the rocks, minerals and other material in the vicinity of the point below the aircraft. For example, the gravity gradiometer measures one or more components of the gradient of gravity related to a geographic area, and is expressed as the gradient of a gravity vector. More specifically, gravity gradiometer data measure spatial gradients of the three components of the gravity field (e.g., Gx, Gy and Gz), and collectively form a tensor at each point in three-dimensional space. Three gradients are computed for each component of the gravity field. A gradient describes the spatial rate of change of that component moving in the three orthogonal directions, while representing minute variations in the three-dimensional gravity field. The gravity tensor T is given below, using a coordinate system in which the x-axis points to the geographic east, y-axis to the north, and z-axis vertically downward.

$$T = \begin{pmatrix} T_{xx} & T_{xy} & T_{xz} \\ T_{yx} & T_{yy} & T_{yz} \\ T_{zx} & T_{zy} & T_{zz} \end{pmatrix} \qquad \text{Equation (1)}$$

From Equation 1, $T_{xx}$ represents the gradient in the x direction of the x component of the gravity (Gx). $T_{yy}$ represents the gradient in the y direction of the y component of the gravity (Gy). $T_{yz}$ represents the gradient in the y direction of the vertical component of the gravity (Gz). $T_{zz}$ represents the vertical gradient of the vertical component of the gravity (Gz), and so forth. The measured gravity gradients thus provide a more detailed picture of the subsurface by reflecting the edges, shape, and approximate depth of dominant mass anomalies.

As shown above in Equation (1), there are nine gradients that can be described in this manner, but only five represent independent gradients, i.e., $T_{xx}$, $T_{xy}$, $T_{xz}$, $T_{yy}$, and $T_{yz}$, because $T_{xy}=T_{yx}$, $T_{xz}=T_{zx}$, and $T_{yz}=T_{zy}$. In addition, $T_{zz}$ is the negative sum of $T_{xx}$ and $T_{yy}$ (i.e., $T_{zz}=-(T_{xx}+T_{yy})$), satisfying LaPlace's equation.

The gravity gradiometer 110 may be of the type, for example, as described in U.S. Pat. No. 5,357,802 to Hofmeyer, et al., entitled "Rotating Accelerometer Gradiometer," which is entirely incorporated herein by reference. Such a device includes 4 or more pairs of rotating accelerometers and outputs two channels of gravity gradient data. One channel, e.g., the in-line channel, is equal to the combination of tensor components, $(T_{uu}-T_{vv})/2$. The other channel, e.g., the cross channel, is equal to $T_{uv}$. (Where the same convention for depicting gradient tensor components using subscripts is being used, here the u and v directions are two directions that are both perpendicular to each other and to the axis about which the accelerometers rotate).

The full tensor gravity gradiometer may include three instruments that each output one cross and one in-line signal. Therefore, six total channels can be used in the production of a tensor dataset. As a result, the gradiometry data includes $T_{xx}$, $T_{xz}$, $T_{xy}$, $T_{yy}$, $T_{yz}$, and $T_{zz}$ tensor data points.

Figure 3:
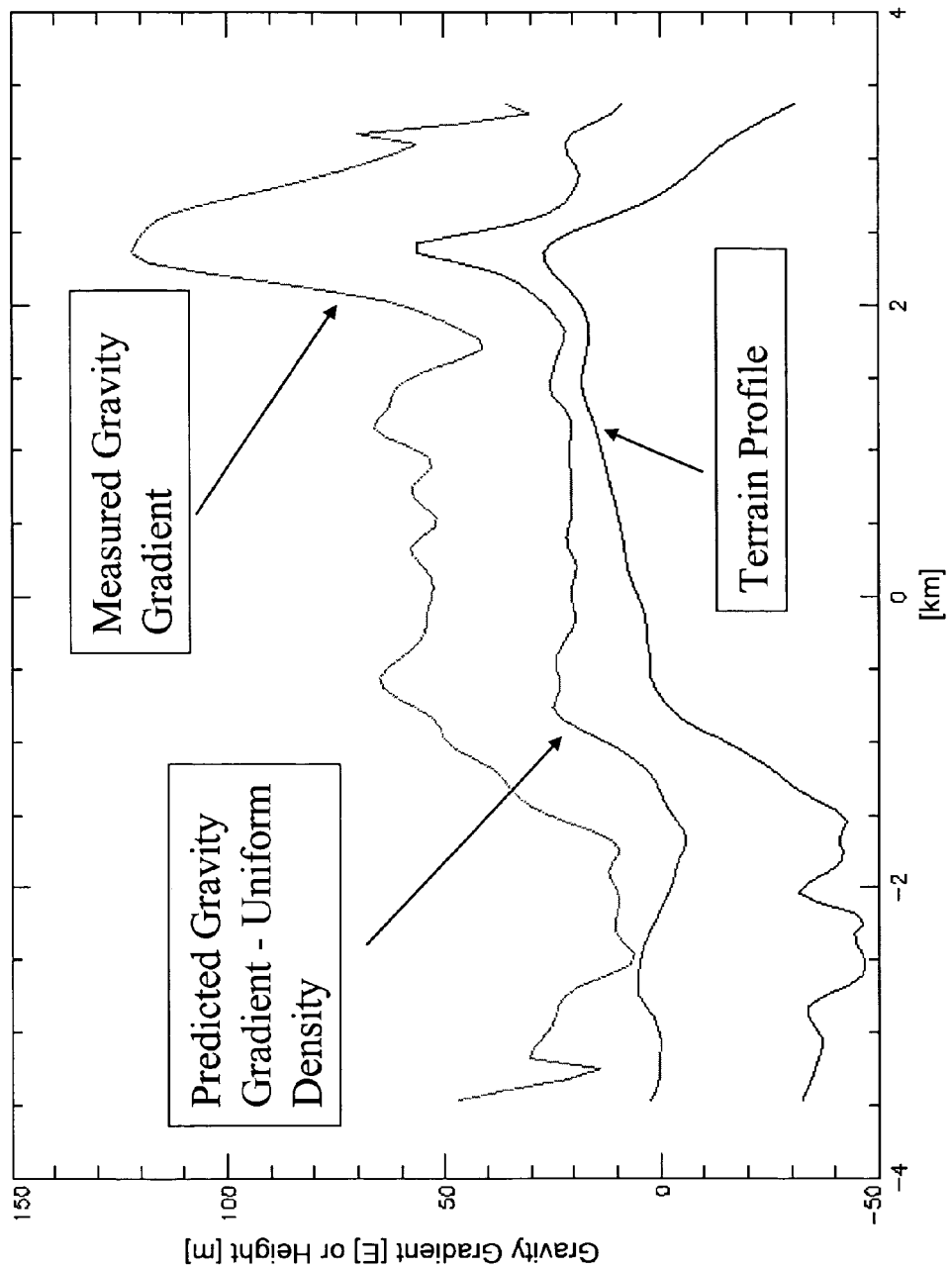
FIG. 3 conceptually illustrates one embodiment of recorded gradiometry data and corresponding terrain from which the data was recorded.

FIG. 3 conceptually illustrates one embodiment of recorded gradiometry data and corresponding terrain from which the data was recorded. An example terrain profile is shown in FIG. 3 as the bottom line on the graph. Above the terrain profile is a gravity gradient that is predicted to be measured (the process of calculated predicted gravity gradients is described more fully below). This predicted gravity gradient signal is the $T_{zz}$ gravity gradient calculated from this terrain using a density value of 2.66 gm/cc. Above the predicted signal is the measured $T_{zz}$ over the terrain. Within FIG. 3, the x axis represents km, over the position of a geographical area where the gravity gradients were recorded. Thus, the km axis simply represents a relative value. As shown, at about x=−1 km, the measured gradient is only a little larger than that for the predicted value. At about x=2.5 km, the peak gradient measured is much bigger than the predicted gradient value. At this point, the appropriate density for the terrain is significantly larger than the predicted 2.66 gm/cc value.

III. Terrain Correction

In many cases, the largest component of the gravity gradient signal originates from the terrain. If the topography is known the gravity gradient of that surface can be calculated if the density is known. A digital elevation map (DEM) can be created containing position data and can be used to facilitate the survey. For example, the DEM is used to calculate the topography generated gravity gradient along a survey line so that the topography generated gravity gradient can be subtracted from measured gravity gradients of an area. This reveals gravity gradient anomalies that are not due to the topography, but rather due to potential ore bodies or hydrocarbon deposits.

Figure 4:
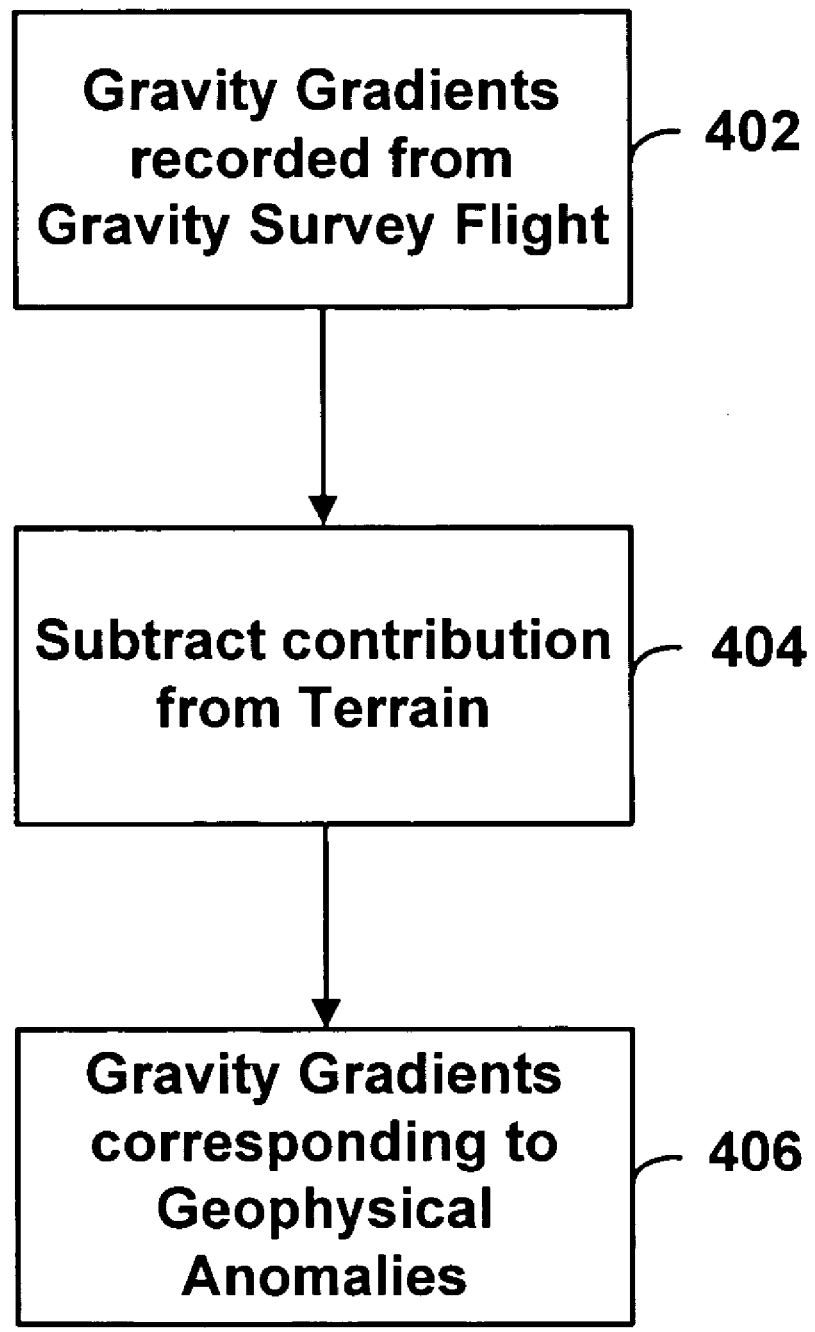
FIG. 4 is a flowchart depicting one embodiment of a method for processing gravity gradiometry signals.

This is shown in FIG. 4, which is a flowchart depicting one embodiment of a method for processing gravity gradiometry signals. Initially, gravity gradiometry signals are recorded from a gravity survey flight, as shown at block 402. Next, gravity gradients corresponding to the terrain are subtracted from the data, as shown at block 404. The resulting data includes gravity gradients corresponding to geophysical anomalies (and noise), as shown at block 406.

Calculations to remove the terrain effect require a detailed knowledge of the local topography and density of the surface rocks in the vicinity of each gravity reading. If the topography of an area is known, the gravity gradient of that surface can be calculated if the density is known. For more information, the reader is referred to "Potential Theory in Gravity and Magnetic Applications," by Richard J. Blakely, Cambridge University Press (1996), which is incorporated herein by reference, and which discusses methods for performing such calculations. For example, in geophysics, calculating the gravity gradient of a surface is referred to as "forward modeling." In one example, the "Prism Method" or modified versions thereof can be used, as are described in the Blakely reference.

In general, a 3-D forward gravity gradient model is calculated so that the model can be subtracted from the 3-D gravity gradient data leaving residual anomalies of all sizes, shapes, and amplitudes (described more fully below). With the 3-D FTG data, first, short wavelength residual anomalies are modeled, i.e., those produced by sources shallower than the zone of interest. These short wavelength residual anomalies can interfere with the longer wavelength residual anomalies that are presumably generated from sources at a depth of exploration interest. Thus, gravity gradient effects from the known geology are removed by removing the residual anomalies from the top down. As the residual anomalies at shallower depths are modeled, the long wavelength residual anomalies will become more apparent.

Figure 5:
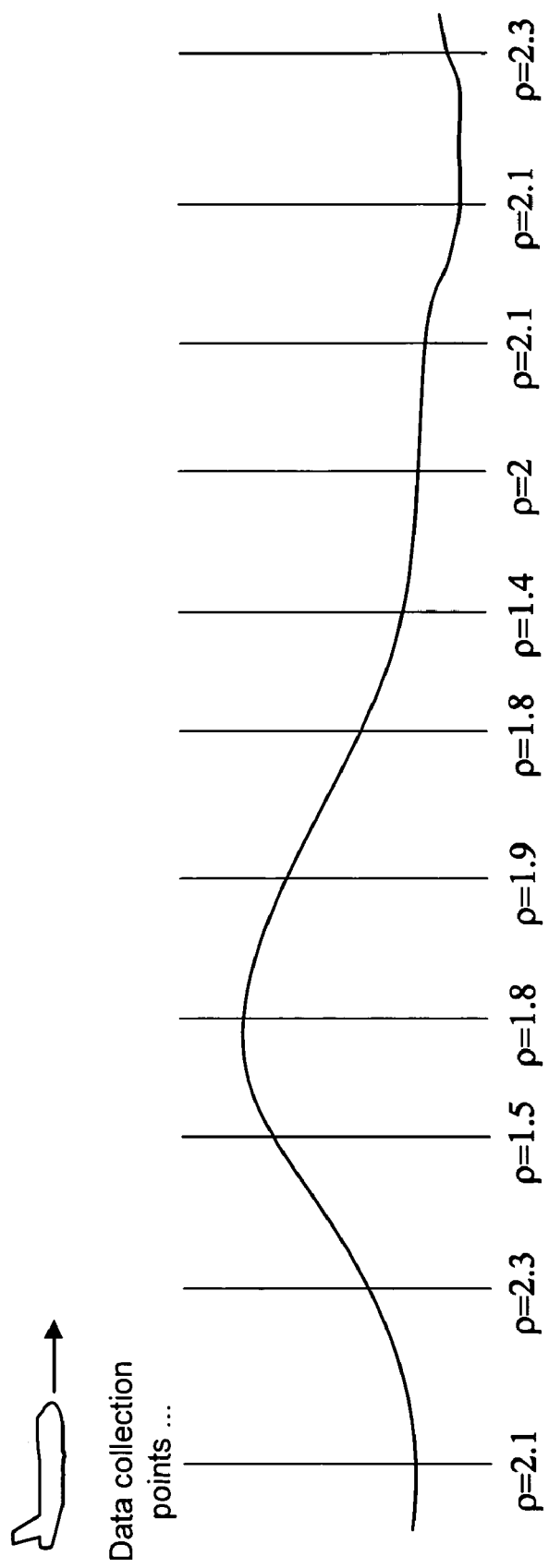
FIG. 5 illustrates one example of a gravity survey flight flown over an area with varying densities.

However, the subsurface of the terrain can have varying densities. FIG. 5 illustrates one example of a gravity survey flight flown over an area with varying densities. Gravity gradient measurements may be taken at any desired interval. As shown in FIG. 5, the terrain has varying densities, and thus, when gradient measurements are taken at the data observation points the gradients correspond to different densities. Thus, when performing a gravity survey, a signal due to recorded gravity gradients and a signal due to the terrain will need to be analyzed and processed using different values of density.

IV. Processing Gravity Gradiometry Signals

In an exemplary embodiment, the gravity gradiometry data is processed by approximating density values of the terrain signals to remove contributions of the terrain from the gravity gradiometry data.

Figure 6:
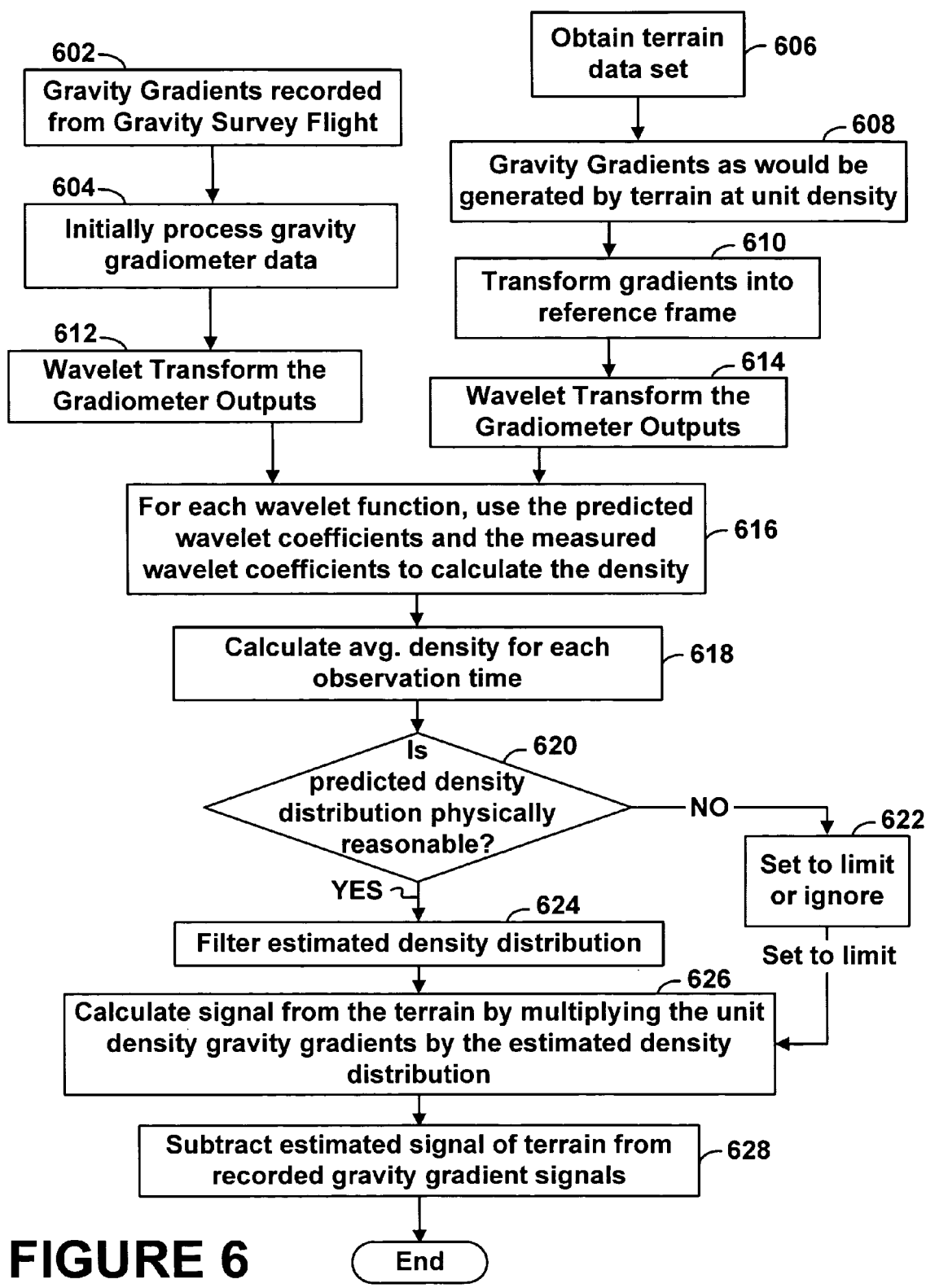
FIG. 6 is a flowchart depicting one embodiment of a method for processing gravity gradiometry signals.

FIG. 6 is a flowchart depicting one embodiment of a method for processing gravity gradiometry signals. Initially, the data that was recorded from a gravity survey flight is obtained, as shown at block 602. For example, data from gravity gradiometer instruments (GGI) is obtained. An FTG contains three GGIs, and therefore, the gravity gradiometer data includes six outputs.

Next, initial processing of the data occurs to remove errors, as shown at block 604. For example, the gravity gradiometer data may be processed as described in U.S. patent application Ser. No. 10/794,606, entitled "Method and System for Evaluating Geophysical Survey Data," which is entirely incorporated by reference herein, as if fully set forth in this description.

Following, the terrain data set is obtained, as shown at block 606. The terrain data set may include a topological map indicating height above sea level for each point on the map. For example, the terrain data set may include a DEM. Terrain data sets can be obtained from lidar surveys, radar altimeter surveys, or even from government funded topological maps. Data from topological maps can be digitized either by standard survey processing software or by measuring contours on a paper map. The digitized data is then re-sampled to a grid spacing required for the gradient forward calculation. Digitized data can be re-sampled using the Oasis Montage software package from Geosoft, Inc., a commonly used geophysical data processing package, for example.

As shown at block 608, next an expected gravity gradient is calculated using the terrain data set and unit density (e.g., by using a forward modeling technique). For example, the gravity gradient due to the terrain is calculated at FTG observation location points using a density equal to 1 gm/cc (grams/cubic centimeter). The gravity gradient can be calculated, for example, using the Prism Method as described in "Potential Theory in Gravity and Magnetic Applications," by Richard J. Blakely, Cambridge University Press (1996), which is entirely incorporated herein by reference.

Briefly, the Prism Method involves approximating a volume of a mass using a collection of rectangular prisms. If the prisms are small enough, each prism can be assumed to have a constant density. Then, using superposition a gravitational anomaly of a mass at any point could be approximated by summing the effects of all the prisms, for example. For example, the Tzz tensor component is calculated at one point due to each prism, and then the sum of the effect from all prisms is Tzz at one observation point. The tensor components can be calculated as follows:

$$T_x = -\frac{gMx}{R^3} \quad \text{Equation (2)}$$

$$T_y = -\frac{gMy}{R^3} \quad \text{Equation (3)}$$

$$T_z = -\frac{gMz}{R^3} \quad \text{Equation (4)}$$

where $g=6.67*10^{-11}*M^3*kg^{-1}sec^{-2}$, M is the mass of the point source, and R is the distance from the point source to the observation point. Thus, to obtain the gravity gradient tensor components, Txx, Txy, Txz, Tyy, Tyz, and Tzz, partial derivatives of the above tensor components can be taken. Recall that $R=\sqrt{(x^2+y^2+z^2)}$, and taking partial derivatives of Equations 3–5 with respect to x, y, and z results in the following equations that can be used to calculate the expected gravity gradient with unit density:

$T_{xx}=-gM_eR^{-3}(1-3x^2R^{-2})$  Equation (5)

$T_{yy}=-gM_eR^{-3}(1-3y^2R^{-2})$  Equation (6)

$T_{zz}=-gM_eR^{-3}(1-3z^2R^{-2})$  Equation (7)

$T_{xz}=3gM_exzR^{-5}$  Equation (8)

$T_{yz}=3gM_eyzR^{-5}$  Equation (9)

$T_{yx}=3gM_eyxR^{-5}$  Equation (10)

Gravity gradients can be calculated using many other methods as well.

Since the FTG output has 6 output channels (e.g., 3 GGI's each outputting an in-line and a cross channel output), the gravity gradient due to the terrain is calculated for each output channel. Thus, at this point, there are two sets of 6 outputs: one set is calculated for a terrain with a set density (e.g., set equal to 1 gm/cc) and the other set is the 6 measured GGI outputs.

Recall that each GGI of the FTG generates two outputs; an in-line and a cross. These are gravity gradients in the coordinate frame of the inertial platform onboard the survey vehicle. However, the calculated gravity gradient components are for a terrain with unit density in a North-East-Down reference frame (e.g., an Earth coordinate frame). Thus, the calculated gradients can be transformed into a reference coordinate frame, e.g,. from a North-East-Down reference frame to an in-line and cross reference frame, so that the calculated gradients will be in the same reference frame as the measured gradients, and can then be compared to the measured gradients, as shown at block 610.

A GGI's measured outputs relationship to gravity gradients in the Earth's coordinate frame depends in part upon an angle between a reference direction (e.g., predefined arbitrary direction) on the inertial platform and true north. The angle is referred to as "the carousel angle." In the course of a survey, the carousel angle may vary from one flight path (or line) to the next by a multiple of 120 degrees, for example. Thus, to transform the outputs into an alternate reference frame, these variations are considered.

As one example, after transforming from the calculated North-East-Down outputs into inline and cross reference frames, the resulting outputs will be inline 1 ($i_1$) and cross 1 ($c_1$) for a first GGI, and similarly for the second and third GGI. As such, the following equation can be used to make the transformation:

$$\begin{pmatrix} i_2 - i_1 \\ i_3 - i_2 \\ c_1 \\ c_2 \\ c_3 \end{pmatrix} = M^{-1} \begin{pmatrix} T_{ZZ} \\ (T_{NN} - T_{EE})/2 \\ T_{NE} \\ T_{NZ} \\ T_{EZ} \end{pmatrix} \quad \text{Equation (11)}$$

where the 5-by-5 matrix M is:

$$M = \begin{pmatrix} 0 & 0 & \frac{2}{3} & \frac{2}{3} & \frac{2}{3} \\ b_1\cos\left(2\theta-\frac{7}{6}\pi\right) & b_1\cos\left(2\theta-\frac{3}{2}\pi\right) & b_3\cos\left(2\theta-\frac{2}{3}\pi\right) & b_3\cos\left(2\theta-\frac{4}{3}\pi\right) & b_3\cos(2\theta) \\ b_1\cos\left(2\theta-\frac{5}{3}\pi\right) & b_1\cos(2\theta) & b_3\cos\left(2\theta-\frac{7}{6}\pi\right) & b_3\cos\left(2\theta-\frac{11}{6}\pi\right) & b_3\cos\left(2\theta-\frac{1}{2}\pi\right) \\ b_2\cos\left(\theta-\frac{11}{6}\pi\right) & b_2\cos\left(\theta-\frac{3}{2}\pi\right) & b_4\cos\left(\theta-\frac{4}{3}\pi\right) & b_4\cos\left(\theta-\frac{2}{3}\pi\right) & b_4\cos(\theta) \\ b_2\cos\left(\theta-\frac{1}{3}\pi\right) & b_2\cos(\theta) & b_4\cos\left(\theta-\frac{11}{6}\pi\right) & b_4\cos\left(\theta-\frac{7}{6}\pi\right) & b_4\cos\left(\theta-\frac{1}{6}\pi\right) \end{pmatrix} \quad \text{Equation (12)}$$

and where $\theta$ is the carousel angle and T are the tensor values. The constant coefficients are:

$b_1 = \frac{2}{9}\sqrt{3}$  Equation (13)

$b_2 = \left(\frac{2}{3}\right)^{\frac{2}{3}}$  Equation (14)

$b_3 = \frac{2}{3}$  Equation (15)

$b_4 = \frac{\sqrt{2}}{3}$  Equation (16)

Since the GGI axes are mutually perpendicular, the inline outputs sum to zero:

$i_1+i_2+i_3=0$  Equation (17)

The three individual inline outputs can then be obtained after some algebraic manipulation as follows:

$i_1=-(2A_2+A_3)/3$  Equation (18)

$i_2=(A_2-A_3)/3$  Equation (19)

$i_3=(A_2+2A_3)/3$  Equation (20)

where:

$$A_2 = i_2 - i_1 \quad \text{Equation (21)}$$

$$A_3 = i_3 - i_2 \quad \text{Equation (22)}$$

Next, as shown at blocks 612 and 614, a mathematical transformation is applied to the recorded gravity gradiometer data and the predicted (calculated) gravity gradiometry. The transformation divides the data into component sub-functions so that each component function can be processed separately. As shown, in one example, the wavelet transformation is applied to the gravity gradiometry data. Thus, all 6 GGI outputs for the measured FTG outputs and all 6 predicted FTG outputs are wavelet transformed. The wavelet transform takes a signal from a sequence of measurements in time-domain and transforms the signal to a set of coefficients that describe that signal. For example, the wavelet transform takes 128 observations of each of the 12 outputs and encodes them with wavelet coefficients. After transforming the data, there are 12 sets of 128 wavelet coefficients (e.g., 1536 total wavelet coefficients): 6 sets corresponding to the predicted FTG outputs and 6 sets corresponding to the measured FTG outputs. The data can be compared to the terrain, one wavelet coefficient at a time.

It should be understood that many other types of mathematical transformations may be applied to the data. For example, the data (both measured and predicted) can be divided into pieces or decomposed arbitrarily, using peaks as break points for example. Next, a Gaussian function can be fit to the peaks, and a Gaussian function can be fit to the unit terrain signal. A difference between amplitudes for the two fitted signals can be determined and identified as the density of the underlying geographical area. Other examples are possible as well.

A brief explanation of the wavelet transform follows. The wavelet transform is a method of decomposing a signal into component parts, and wavelet decomposition provides a means of fitting the terrain to the FTG output if the surface density is not exactly known, for example.

Using the wavelet transformation, the gradiometry data is expressed as a sum of orthogonal component functions each multiplied by a scalar coefficient. These functions are referred to as "wavelet functions" that contain both frequency and location information. Thus, the wavelet transform may be used when the time localization of frequency spectral components is needed, e.g., a transform giving a time-frequency representation of the signal. Using the wavelet transform, rather than a time-series of 128 observations, the gravity gradient signal can be expressed as a set of 128 coefficients giving amplitudes of the component wavelet functions. For more information regarding the wavelet transform, the reader is referred to "Ten Lectures on Wavelets," by I. Daubechies, CBMS-NSF Regional Conference Series in Applied Mathematics, No. 61, SIAM Review, 1992, which is entirely incorporated herein by reference.

Figure 7:
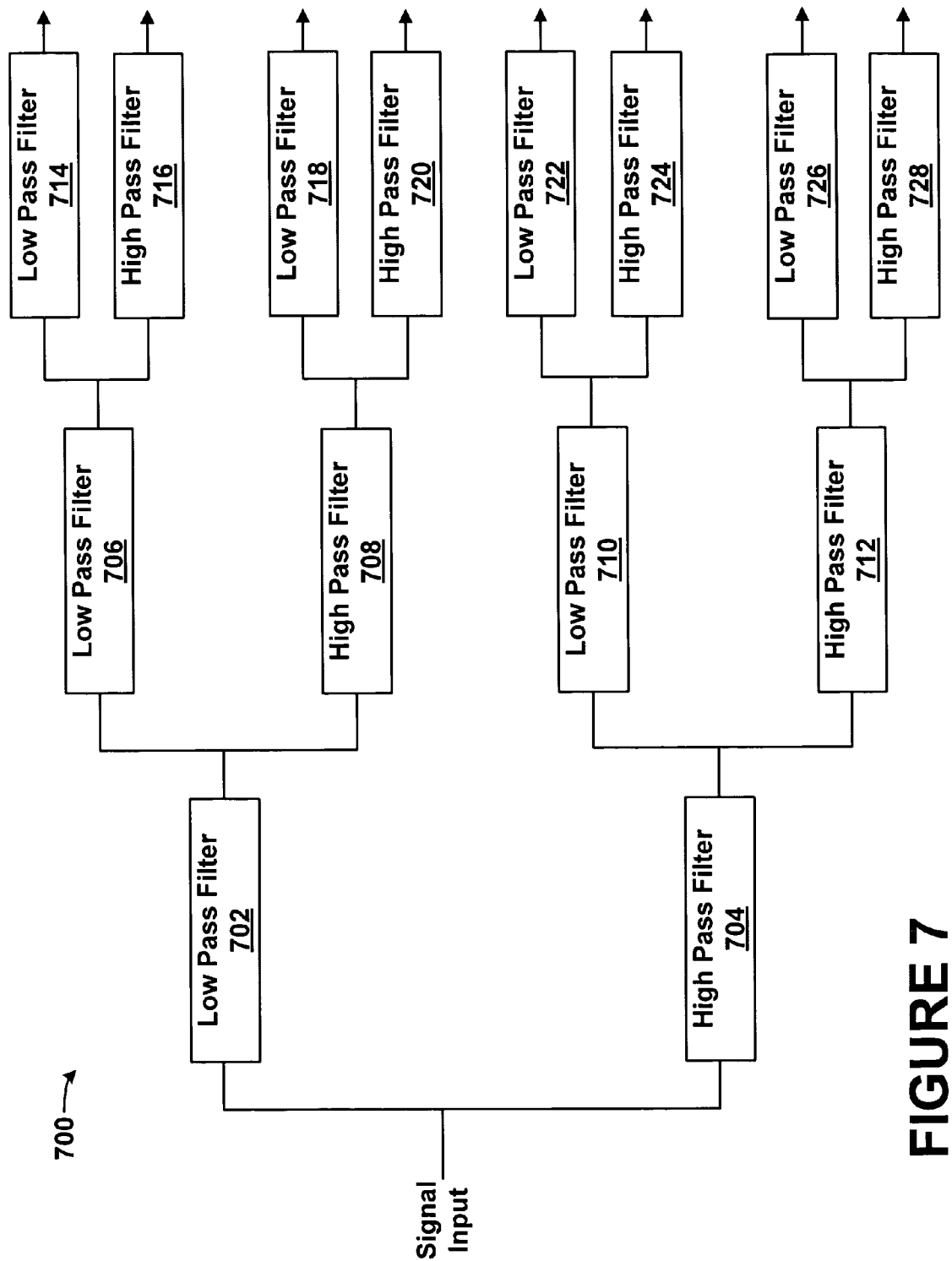
FIG. 7 is a block diagram illustrating one embodiment of decomposing the gravity gradiometer data.

FIG. 7 is a block diagram illustrating one embodiment of decomposing the gravity gradiometer data. As an illustrative example, suppose the data includes a signal that has frequencies up to 1000 Hz. Initially, the signal is split up into two parts by passing the signal through a lowpass filter 702 and a highpass filter 704 (the filters should satisfy some certain conditions, referred to as "admissibility conditions"), which results in two different versions of the same signal: a portion of the signal corresponding to 0–500 Hz (low pass portion) and 500–1000 Hz (high pass portion). Next, either portion (e.g., usually low pass portion) or both is split again by passing the respective portions through the filters 706, 708, 710 and 712. This operation is referred to as decomposition.

Now there are four sets of data, each corresponding to the same signal at frequencies 0–250 Hz, 250–500 Hz, 500–750 Hz and 750–1000 Hz. Then, these portions of the signal are passed through respective filters 714–728 to split the signals again and obtain eight sets of signals corresponding to 0–125 Hz, 125–250 Hz, 250–375 Hz, 375–500 Hz, 500–625 Hz, 625–750 Hz 750–875 Hz and 875–1000 Hz. This process continues until the signal has been decomposed to a pre-defined certain level. The resulting combination of signals output from the last stage of filters represent the same signal, but all corresponding to different frequency bands. Plotting all the signals together on a three-dimensional graph, with time in one axis, frequency in the second and amplitude in the third axis illustrates which frequencies exist at which time (however, the "uncertainty principle," which states that, it is not exactly known what frequency exists at what time instance, but that it is only known what frequency bands exist at what time intervals can be ignored for purposes of the data processing herein).

To complete the wavelet transformation on the gravity gradiometer data, decomposed signals are multiplied by a function, e.g., the wavelet function or window function. The transform is computed separately for the different segments (or decomposed portions) of the time-domain signal. To qualify as a wavelet function, the function should be orthogonal, i.e., changing one coefficient does not effect the values of any of the coefficients, and the function should have self similitude, i.e., the functions are all the same shape but differ in width by powers of two. A large number of sets of functions satisfying these conditions have been identified. As one example, the DAUB4 (for Daubechies) function or the D4 transform can be used. The DAUB4 function has a saw-tooth shape with a single peak and a single trough. Thus, to complete the transformation, the decomposed signals are multiplied by this function, for example, as shown below:

$$\text{Wavelet Coef.} = (D4 \text{ transformation matrix}) * (\text{Decomposed Gravity Gradient Signals}) \quad \text{Equation (23)}$$

For more information on the DAUB4 function, the reader is referred to "Numerical Recipes in C: the Art of Scientific Computing," William Press et al—$2^{nd}$ edition, Cambridge University Press, 1992, the entirety of which is incorporated herein by reference. For more information regarding additional wavelet functions, the reader is referred to "A Wavelet Tour of Signal Processing," by Stephane Mallat, Academic Press; 2 edition, 1999, which in entirely incorporated herein by reference.

Transforming the geophysical data using the wavelet transformation gives frequency information at a specific time. This information is useful because the data is collected by flying over a particular feature, and the time information can be used to synchronize data, for example. Resulting wavelet coefficients represent how the data is divided into frequencies at different points in space. The term wavelet refers to a small wave, and the smallness refers to the condition that the window function has finite length. The term wave refers to the condition that this function is oscillatory. The term translation is related to the location of the window, e.g., the window is shifted through the signal, and this corresponds to time information in the transform domain.

There is a linear relationship between the predicted wavelet coefficients and the recorded wavelet coefficients if little or no noise or signal from sources other than terrain is present. Note that multiplying the predicted wavelet coefficients by the density of the terrain results in the measured wavelet coefficients (since predicted wavelet coefficients were calculated using a unit density). Thus, the coefficients of the measured 6 GGI outputs, $y_i$, are given by:

$$y_i = \rho x_i \quad \text{Equation (24)}$$

where i=1 to 6, $x_i$ are the wavelet coefficients of the 6 GGI outputs predicted by a terrain of unit density and $\rho$ is the density. The value of $\rho$ may not be known exactly, and thus the value of $\rho$ that best fits the measured GGI outputs is found. This $\rho$-value is then used to calculate a gravity gradient signal form the terrain.

There are several methods that can be applied when choosing a $\rho$-value. Referring back to the flowchart in FIG. 6, after wavelet transforming the recorded and predicted gravity gradiometer data (resulting in 12 sets of 128 wavelet coefficients), for each wavelet coefficient, the predicted wavelet coefficients are plotted versus the recorded wavelet coefficients, as shown at block 616. For example, after wavelet transforming the recorded and predicted data, there will be 128 wavelet coefficients for each signal from both output channels (in-line and cross, e.g., output channel-1 and output channel-2) for the 3 GGIs, and 128 wavelet coefficients for the 6 predicted GGI outputs.

Each wavelet coefficient corresponds to a finite period of time. Hence, using the wavelet transformation gives frequency information at a specific time. A GGI records data at observation points during a survey flight. The GGI may record data 128 readings per second, for example. Each recording corresponds to an observation point over the geographical area being surveyed. Thus, for a portion of a survey (or an entire survey), there will be n observation points, for example.

The wavelet transformation may not correlate the resulting wavelet coefficients exactly with the time periods of the observation points. Thus, a wavelet coefficient may represent a time period that overlaps a time period of multiple observation points, for example.

As mentioned, there is a linear relationship between the predicted wavelet coefficient and the recorded wavelet coefficient if no noise or signal from sources other than terrain is present. If the predicted wavelet coefficients are plot on one axis and the measured wavelet coefficients are plot on the other axis, and if there is no noise and all data in the signal was due to the terrain, then the slope of a straight line fit through the origin is the density of the terrain from which the signals were recorded. In practice, the signals contain noise, and further, the signals contain data corresponding to anomalies within the terrain. For embodiments described herein, however, the slope is assumed to be constant. Thus, for each wavelet function the slope of the line through the origin that best matches the coefficient values for the 6 observed GGI output channels to the 6 predicted GGI output channels is found, for example.

Thus, all #1 wavelet coefficients for the 6 GGI measured output channels are plot vs. all #1 wavelet coefficients for the 6 GGI predicted outputs. Next, a straight line, passing through the origin, is fit through the points resulting on the plot, and the slope of this line is the density corresponding to the #1 wavelet coefficient. This process is repeated 128 times for all 128 observations.

Figure 8:
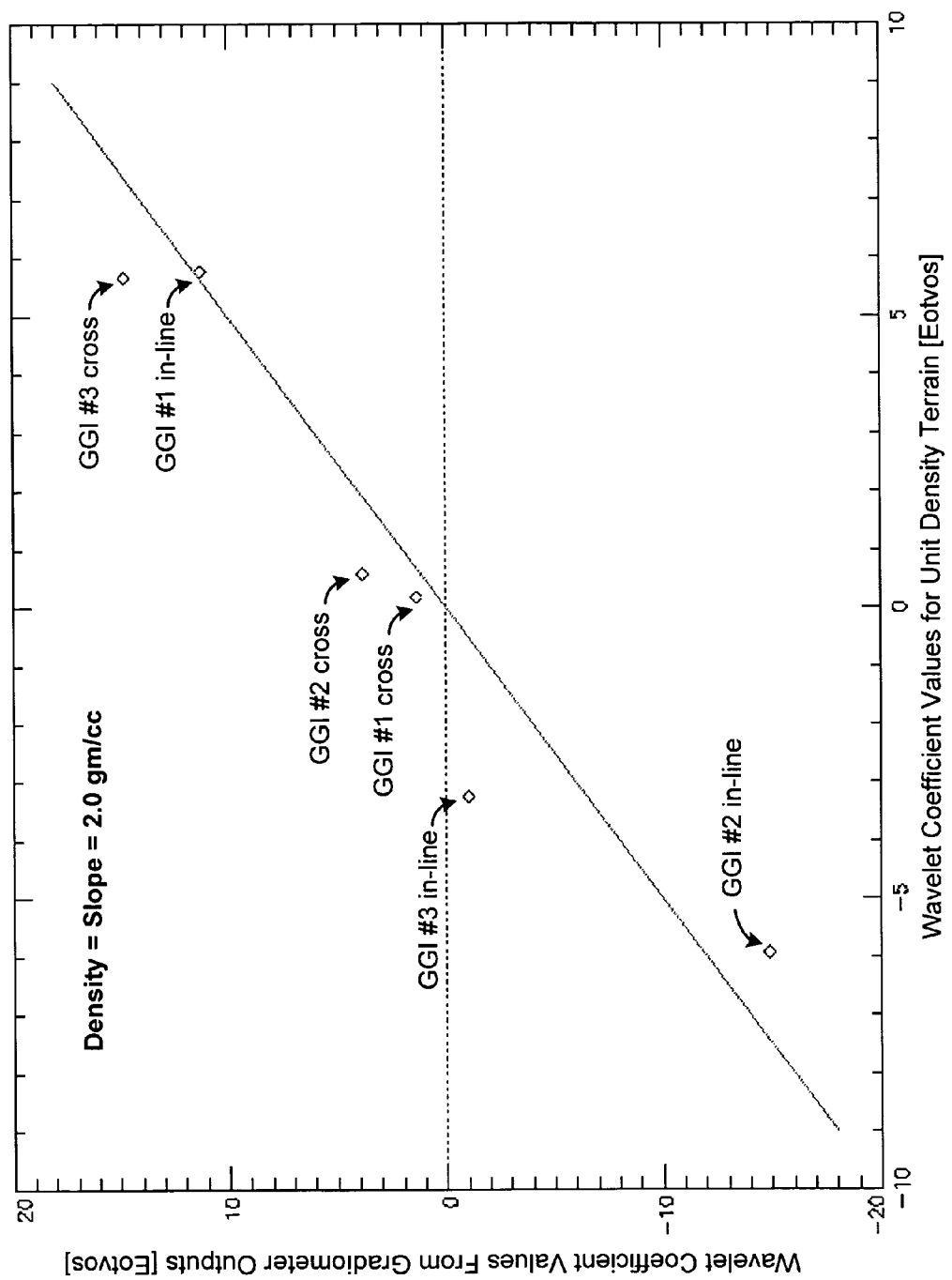
FIG. 8 illustrates one example of a plot of the predicted wavelet coefficients versus the recorded or measured wavelet coefficients.

FIG. 8 illustrates one example of a plot of the predicted wavelet coefficients versus the recorded or measured wavelet coefficients. In this example, the wavelet coefficients resulting from the calculated gravity gradients are plot on the x-axis and the wavelet coefficients resulting from the measured gravity gradients are plot on the y-axis. Thus, for a first GGI, the (x,y) point would be (calculated wavelet coefficient, measured wavelet coefficient). Thus, resulting (x,y) points for all 6 GGIs are plot on the graph as shown. A linear fit is then accomplished by drawing a line through the origin and making a best fit to the plotted points. The slope of the line is the density corresponding to a time period. In this example, the resulting slope is 2, and thus the density for the terrain in this time period is 2 gm/cc.

Since the wavelet coefficients are localized, for each wavelet coefficient there is a range of times at which the measurement occurred. Thus, referring back to FIG. 6, after completing 128 linear fits and obtaining 128 density estimations, average density estimations are generated, as shown at block 618. For example, each wavelet coefficient may correspond to multiple observation points. In particular, each wavelet coefficient has a maximum and minimum time corresponding to the point in time for which the wavelet transformation took place. Thus, to obtain an estimated density reading for an observation point (or during one time period), multiple densities may be averaged.

As a specific example, observation point #2 corresponds to the time period for which wavelet coefficients #1 and #2 were calculated. Thus, the densities that were obtained from plots of the measured and predicted wavelet coefficients for both wavelet coefficients #1 and #2 can be averaged to form a single density estimate for observation time period #2. Note, however, that there may be more than one density prediction corresponding to a specific observation time period.

Next, as shown at block 620, it is determined whether the averaged density is physically reasonable. For example, a density value between about 1 gm/cc and about 4 gm/cc may be physically reasonable for some areas. Thus, between about 1 gm/cc and about 4 gm/cc could be used as the threshold test. If the predicted average density is not within this range (could be due to noise), for example, then that density value may simply be ignored. Alternatively, as shown at block 622, if the density value is not within a desired density range, then the density can just be set to a predetermined value, such as the maximum or minimum density value within the range for example. Thus, the density value can be constrained to fall to within a range of values that are geologically realistic. If the fitted value falls above or below the realistic range, then the nearest value on that range could be also used instead. For example, it is too low, then it is set to the smallest possible density value.

Using this technique, it is possible to combine the 6 GGI outputs in such a way that noisy channels can be eliminated. For example, if the density that is obtained from the slope is unrealistic, larger than a predefined value, or smaller than a predefined value, then this data may constitute noise and a predetermined value for the density could be used. Alternatively, the value of this wavelet coefficient could be set to zero to be ignored. Furthermore, when analyzing all 6 GGI outputs, any outlying points can be dropped instead (e.g., if noise is present on one channel but not others, then that channel output could be ignored).

If the density value does fall within a desired range of values (or if the density was set to a value), then the density distribution is filtered, as shown at block 624. It may be beneficial to filter the distribution due to the presence of noise that may cause more high frequency activity in the density estimate than is physically reasonable. Thus, to filter the density value, for example, the density value can be filtered using a 1-dimensional smoothing filter, such as a moving average boxcar filter. Thus, a standard digital low-pass filter can be applied to the time-sequence of density estimates.

Alternatively, to perform the filtering, the density value can be grid in 2 dimensions and the grid can be filtered to smooth the lines and take neighboring data into account. Thus, a spatial filtering can be performed using a standard gridding algorithm to map the density data in two dimensions based on latitude and longitude values that were recorded with each observation. A standard 2-D low-pass filter is then applied to this grid and the filtered result is re-interpolated back to the original observation locations. One example gridding process that may be used is the "Average Value Method," described in *Contouring Geologic Surfaces With the Computer*, by Thomas A. Jones, David E. Hamilton and Carlton R. Johnson, and published by Van Nostrand Reinhold in October 1986. Other gridding processes may be used as well.

Next, gravity gradients corresponding to the terrain are calculated using the unit density gravity gradients and the estimated average densities, as shown at block 626. To calculate the terrain gravity gradient, the unit density gravity gradients are multiplied by the average gravity gradient corresponding to an observation time period during which a unit gradient was calculated.

Following, this calculated terrain gravity gradient signal is subtracted from the recorded gravity gradient signals, for each observation time period, as shown at block 628. A combination of the resulting signals for all observation time periods reveals gravity gradient corresponding to non-terrain effects of the geographical area. The method shown in FIG. 6 can be repeated for the FTG outputs for an entire gravity flight survey, for example, to attempt to identify geological anomalies within a sub-terrain of a geographical area.

Within the method of FIG. 6, sometimes a GGI output channel may be noisier than the others, and in this case, the noisy channel may be ignored when determining the density values. In one embodiment, the density may be determined using all the channels, and then the density may be determined ignoring all channels for which the measured value differs from the predicted value by more than a predetermined threshold amount, for example. Other variations to the method illustrated in FIG. 6 exist as well.

V. System for Processing Gravity Gradiometry Signals

The method illustrated in FIG. 6 may be performed by a number of different elements of a geophysical instrument system. For example, the gradiometer 110 in FIG. 2, or the GGIs may perform the gravity gradiometry signal processing. Further, any system, such as a system located at a central office, can receive the survey flight data and perform the signal processing.

Figure 9:
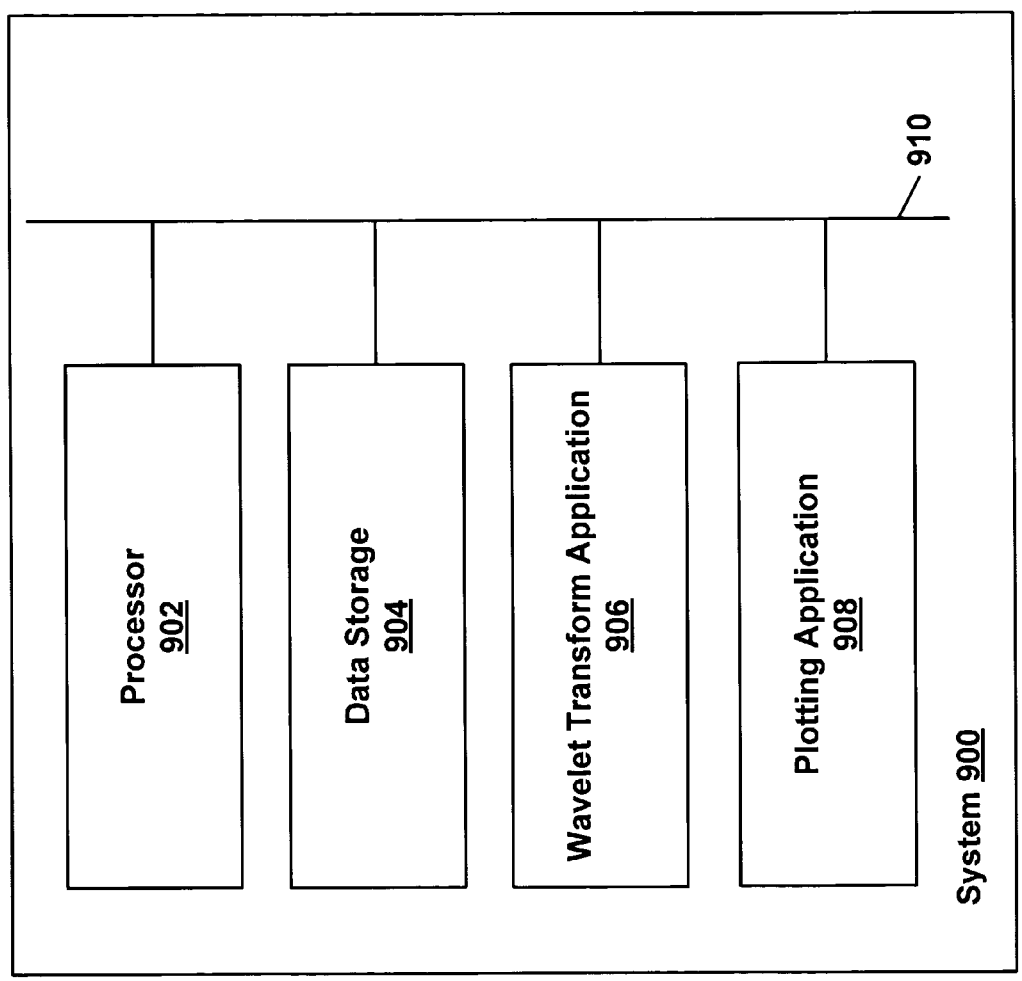
FIG. 9 is a block diagram illustrating one embodiment of a system for processing gravity gradiometry signals.

FIG. 9 illustrates one embodiment of a system 900 for processing the gravity gradiometry signals. The system 900 includes a processor 902, data storage 904, a wavelet transform application 906, and a plotting application 908, all of which may be interconnected through a system bus 910, for example.

The data storage 904 serves to store data, such as gravity gradient data, for example. The data storage 904 may take various forms, in one or more parts. For example, the data storage 904 may comprise random access memory (RAM) or read only memory (ROM), which holds program instructions and data defining logic executable by the processor 902. In addition, the data storage 904 may comprise a removable storage medium, such as a Flash memory card for instance. The data storage 904 could be integrated in whole or in part with processor 902.

The processor 902 may access the data storage 904 and execute the wavelet transform application 906 and the plotting application 908 to calculate terrain gravity gradient signals for recorded gravity gradients, as explained above with reference to FIG. 6.

Since many modifications, variations, and changes in detail can be made to the described embodiments, it is intended that all matters in the foregoing description and shown in the accompanying drawings be interpreted as illustrative and not in a limiting sense. For example, embodiments in the present application are described using a FTG sensor. However, gravity gradients signals recorded using any gradiometer, such as a two channel gradiometer, may be processed according to described embodiments. Moreover, not only can gravity gradients be processed according to described embodiments, but also gravity data recorded from a gravimeter can also be processed according to described embodiments. Furthermore, the described embodiments can also be applied to higher derivative gradiometry data as well, to determine a terrain signal for recorded signals, for example.

It is intended that the foregoing detailed description be regarded as illustrative rather than limiting, and it is intended to be understood that the following claims including all equivalents define the scope of the invention.

What is claimed is:

1. A method comprising:
   receiving geophysical data recorded from a geographical area by a sensor;
   calculating predicted geophysical data of the geophysical area using a fixed geophysical parameter, wherein the fixed geophysical parameter is a fixed density value and wherein the fixed density value is unit density; and
   identifying a relationship between the geophysical data and the predicted geophysical data.

2. The method of claim 1, wherein calculating predicted geophysical data of the geophysical area using the fixed geophysical parameter comprises calculating the predicted geophysical data using more than one fixed geophysical parameter.

3. The method of claim 1, wherein identifying the relationship between the geophysical data and the predicted geophysical data comprises determining a surface density signal representative of a portion of terrain of the geographical area.

4. The method of claim 1, wherein the geophysical data includes full-tensor gravity gradient signals.

5. The method of claim 1, wherein identifying the relationship comprises identifying a linear proportionality between the geophysical data and the predicted geophysical data.

6. The method of claim 1, wherein identifying the relationship between the geophysical data and the predicted geophysical data comprises comparing the geophysical data and the predicted geophysical data.

7. The method of claim 1, wherein the sensor is selected from the group consisting of a gravity gradiometer instrument (GGI) and a gravimeter.

8. The method of claim 1, wherein the sensor is a multi-channel sensor.

9. The method of claim 1, wherein the sensor is a full-tensor gradiometer (FTG).

10. The method of claim 1, wherein the sensor has at least 6 channels.

11. The method of claim 1, further comprising dividing the geophysical data and the predicted geophysical data into components.

12. The method of claim 1, further comprising performing a wavelet transformation of the geophysical data and the predicted geophysical data to produce recorded wavelet coefficients and predicted wavelet coefficients.

13. The method of claim 12, further comprising generating a plot of the recorded wavelet coefficients versus the predicted wavelet coefficients.

14. The method of claim 13, further comprising plotting a best fit line through points on the plot.

15. The method of claim 14, wherein identifying the relationship comprises identifying a slope of the best fit line.

16. The method of claim 15, wherein identifying the slope of the best fit line comprises identifying a density of a portion of a terrain in the geophysical area.

17. The method of claim 12, further comprising determining a proportionality constant between the recorded wavelet coefficients and the predicted wavelet coefficients.

18. The method of claim 17, wherein the proportionality constant is a density of the geographical area.

19. The method of claim 1, further comprising determining a density of a portion of a terrain in the geophysical area.

20. The method of claim 19, further comprising calculating a signal representative of the portion of the terrain using the density and the predicted geophysical data.

21. The method of claim 20, further comprising subtracting the signal representative of the portion of the terrain from the geophysical data.

22. A computer readable medium having stored therein instructions for causing a central processing unit to execute the method of claim 1.

23. A method for processing geophysical data comprising:
receiving geophysical data recorded from a geographical area by a sensor, wherein the geophysical data includes gravity gradient signals;
dividing the geophysical data into components; and
processing the components to reveal geophysical data not corresponding to a terrain of the geographical area.

24. The method of claim 23, further comprising calculating predicted geophysical data of the geophysical area using a fixed geophysical parameter.

25. The method of claim 23, further comprising identifying a relationship between the geophysical data and the predicted geophysical data.

26. The method of claim 23, wherein the sensor comprises at least three gravity gradiometer instruments, and each gravity gradiometer instrument has two output channels.

27. The method of claim 26, wherein dividing the geophysical data into components comprises wavelet transforming the geophysical data so as to produce a plurality of wavelet coefficients representing the geophysical data.

28. The method of claim 27, wherein wavelet transforming the geophysical data so as to produce the plurality of wavelet coefficients representing the geophysical data comprises producing a plurality of wavelet coefficients for the two output channels for each gravity gradiometer instrument.

29. The method of claim 27, wherein processing the components comprises processing corresponding wavelet coefficients of the two output channels for each gravity gradiometer instrument together.

30. The method of claim 23, wherein the sensor is selected from the group consisting of a gravity gradiometer instrument (GGI), a gravimeter, a multi-channel sensor, and a full-tensor gradiometer (FTG).

31. A computer readable medium having stored therein instructions for causing a central processing unit to execute the method of claim 23.

32. A method comprising:
receiving gravity gradients recorded from a gravity survey flight covering a geographical area;
calculating predicted gravity gradients of the geophysical area corresponding to a terrain having a unit density;
performing a wavelet transformation of the gravity gradients and the predicted gravity gradients so as to generate recorded wavelet coefficients and predicted wavelet coefficients; and
determining an estimated density of surface terrain of the geophysical area using the recorded wavelet coefficients and the predicted wavelet coefficients.

33. The method of claim 32, further comprising, if the estimated density is not within a predetermined range, setting the estimated density to a desired density value.

34. The method of claim 32, further comprising, if the estimated density is not within a predetermined range, ignoring the recorded wavelet coefficients and the predicted wavelet coefficients.

35. The method of claim 32, further comprising calculating a gravity gradient signal from the surface terrain of the geophysical area using the predicted gravity gradients and the estimated density.

36. The method of claim 35, further comprising subtracting the gravity gradient signal from the surface terrain of the geophysical area from the gravity gradients recorded from the gravity survey flight covering the geographical area.

37. A computer readable medium having stored therein instructions for causing a central processing unit to execute the method of claim 32.

38. A system comprising:
a processor;
data storage; and
instructions stored in the data storage executable by the processor to (i) receive geophysical data recorded from a geographical area by a sensor, wherein the geophysical data includes gravity gradient signals, (ii) divide the geophysical data into components, and (iii) process the components to reveal geophysical data not corresponding to a terrain of the geographical area.

39. The system of claim 38, wherein the system is selected from the group consisting of a gravity gradiometer instrument (GGI), a full-tensor gradiometer (FTG) and a computer.

* * * * *